(12) United States Patent
Kim et al.

(10) Patent No.: US 11,714,590 B2
(45) Date of Patent: Aug. 1, 2023

(54) DISPLAY CONTROL APPARATUS WITH BRIGHTNESS CONTROL

(71) Applicant: HYUNDAI MOBIS Co., Ltd., Seoul (KR)

(72) Inventors: Tae Hun Kim, Seongnam-si (KR); Sung Joon Ahn, Seongnam-si (KR); Seung Hwan Lee, Hwaseong-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 15 days.

(21) Appl. No.: 17/559,109

(22) Filed: Dec. 22, 2021

(65) Prior Publication Data

US 2022/0222024 A1    Jul. 14, 2022

(30) Foreign Application Priority Data

Jan. 13, 2021 (KR) .................. 10-2021-0004942

(51) Int. Cl.
*G09G 5/10* (2006.01)
*G06F 3/14* (2006.01)

(52) U.S. Cl.
CPC .............. *G06F 3/14* (2013.01); *G09G 5/10* (2013.01)

(58) Field of Classification Search
CPC ............ G06F 3/14; G06F 3/147; G09G 5/10; G09G 5/02; G09G 2320/06; G09G 2320/0626; G09G 2320/066; G09G 2320/0666; G09G 2380/06; G09G 2380/10; B60K 37/06; B60K 35/00; B60K 2370/152; B60K 2370/349; B60K 2370/52; B60W 40/02; B60W 50/14; B60W 2050/0005; B60W 2050/146
See application file for complete search history.

(56) References Cited

U.S. PATENT DOCUMENTS

| | | | |
|---|---|---|---|
| 7,877,913 B1 * | 2/2011 | King | G09F 21/042 40/493 |
| 11,104,267 B1 * | 8/2021 | Mazuir | B60Q 1/549 |
| 2017/0259729 A1 * | 9/2017 | Balasundrum | G07C 5/008 |
| 2019/0135174 A1 * | 5/2019 | Brown | H05B 45/20 |
| 2020/0375012 A1 * | 11/2020 | Betz | H05B 47/165 |

* cited by examiner

*Primary Examiner* — Rodney Amadiz
(74) *Attorney, Agent, or Firm* — NSIP Law

(57) ABSTRACT

A display control apparatus includes: an inputter configured to receive internal display information and external display information about a vehicle; a memory storing a control program for an internal display of the vehicle and an external display of the vehicle; and a processor configured to perform control on a brightness of the internal display and a brightness of the external display, in connection with a portable terminal, by executing the control program.

11 Claims, 12 Drawing Sheets

: GRAY

< : RED

: YELLOW  : BLUE

◊ : GRAY

◊ : LIGHTGRAY

DISPLAY CONTROL APPARATUS WITH BRIGHTNESS CONTROL

CROSS-REFERENCE TO RELATED APPLICATIONS

This application claims the benefit under 35 U.S.C. § 119(a) of Korean Patent Application No. 10-2021-0004942 filed on Jan. 13, 2021 in the Korean Intellectual Property Office, the entire disclosure of which is incorporated herein by reference for all purposes.

TECHNICAL FIELD

The disclosure relates to a display control apparatus, and more particularly, to a display control apparatus which controls a brightness setting of each of the internal display and external display of a vehicle on the basis of a driving environment.

BACKGROUND

In the related art, in a case where an external communication lamp is displayed by a projector light source, there is a problem where external display information is not clearly seen due to day and night, a rain situation, an adjacent headlamp, and/or the like.

Moreover, display is performed even when external display is not needed, and due to this, there is a problem where power consumption occurs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a display control apparatus includes: an inputter configured to receive internal display information and external display information about a vehicle; a memory storing a control program for an internal display of the vehicle and an external display of the vehicle; and a processor configured to perform control on a brightness of the internal display and a brightness of the external display, in connection with a portable terminal, by executing the control program.

The processor may be further configured to adjust the brightness of the internal display based on a setting signal input to the portable phone, and adjust a brightness of the portable phone to correspond to the adjusted brightness of the internal display.

The processor may be further configured to adjust the brightness of the external display based on a setting signal input to the portable phone, and adjust a brightness of the portable phone to correspond to the adjusted brightness of the external display.

The processor may be further configured to transmit a brightness control signal generated based on a brightness of a headlamp and corresponding to a partial dark region of the external display.

The processor may be further configured to transmit a control signal to apply a complementary color to a sentence displayed on the partial dark region.

The processor may be further configured to transmit a control signal so that a sentence displayed on the partial dark region is displayed more brightly than other regions of the external display.

The processor may be further configured to automatically control the brightness of the external display to a predetermined brightness based on a presence of a pedestrian.

The processor may be further configured to determine whether to activate the external display, based on a driving environment.

In another general aspect, a method with display control includes: performing, by a processor, control on a brightness of an internal display of a vehicle and a brightness of an external display of the vehicle, in connection with a portable terminal.

The method may further include: adjusting, by the processor, the brightness of the internal display based on the setting signal; and adjusting, by the processor, a brightness of the portable phone to correspond to the adjusted brightness of the internal display.

The method may further include: adjusting, by the processor, the brightness of the external display based on the setting signal; and adjusting, by the processor, a brightness of the portable phone to correspond to the adjusted brightness of the external display.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. Hereinafter, embodiments of the present invention will be described in detail with reference to the accompanying drawings.

The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
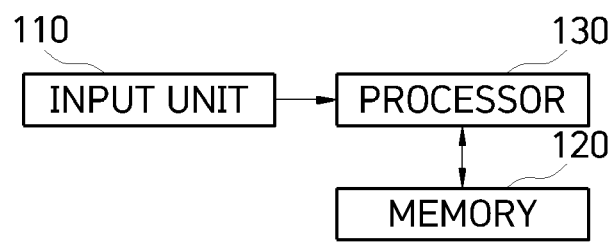
FIG. 1 illustrates a display control apparatus according to an embodiment.

FIG. 1 illustrates a display control apparatus according to an embodiment of the present invention.

The display control apparatus according to an embodiment of the present invention may include an input unit 110 (which may also be referred to as an inputter 110) which receives internal display and external display information about a vehicle, a memory 120 which stores a control program for internal display and external display, and a processor 130 which executes a program. The processor 130 may perform control on the brightness of internal display and external display in connection with a portable phone.

The processor 130 may adjust brightness of the internal display on the basis of a setting signal input to the portable phone and may adjust brightness of the portable phone to correspond to the adjusted brightness of the internal display.

The processor 130 may adjust brightness of the external display on the basis of the setting signal input to the portable phone and may adjust brightness of the portable phone to correspond to the adjusted brightness of the external display.

The processor 130 may transmit a brightness control signal which is generated based on brightness of a headlamp and corresponds to a partial dark region of the external display.

The processor 130 may transmit a control signal so as to apply a complementary color to a sentence displayed on a dark region.

The processor 130 may transmit the control signal so that a sentence displayed on the dark region is relatively brighter displayed than the other regions.

The processor 130 may automatically control brightness of the external display to predetermined brightness on the basis of the presence of a pedestrian.

The processor 130 may determine whether to activate the external display, on the basis of a driving environment.

According to an embodiment of the present invention, an external pedestrian may easily recognize information displayed on the external display, and colors of a letter and a background of the external display may be differently adjusted based on a driving time, thereby enhancing visibility.

According to an embodiment of the present invention, luminance may be set in setting brightness with a portable phone, and when it is not needed to check the external display information, electricity may be saved by turning off a screen and a driving distance may be enhanced.

Figure 2:
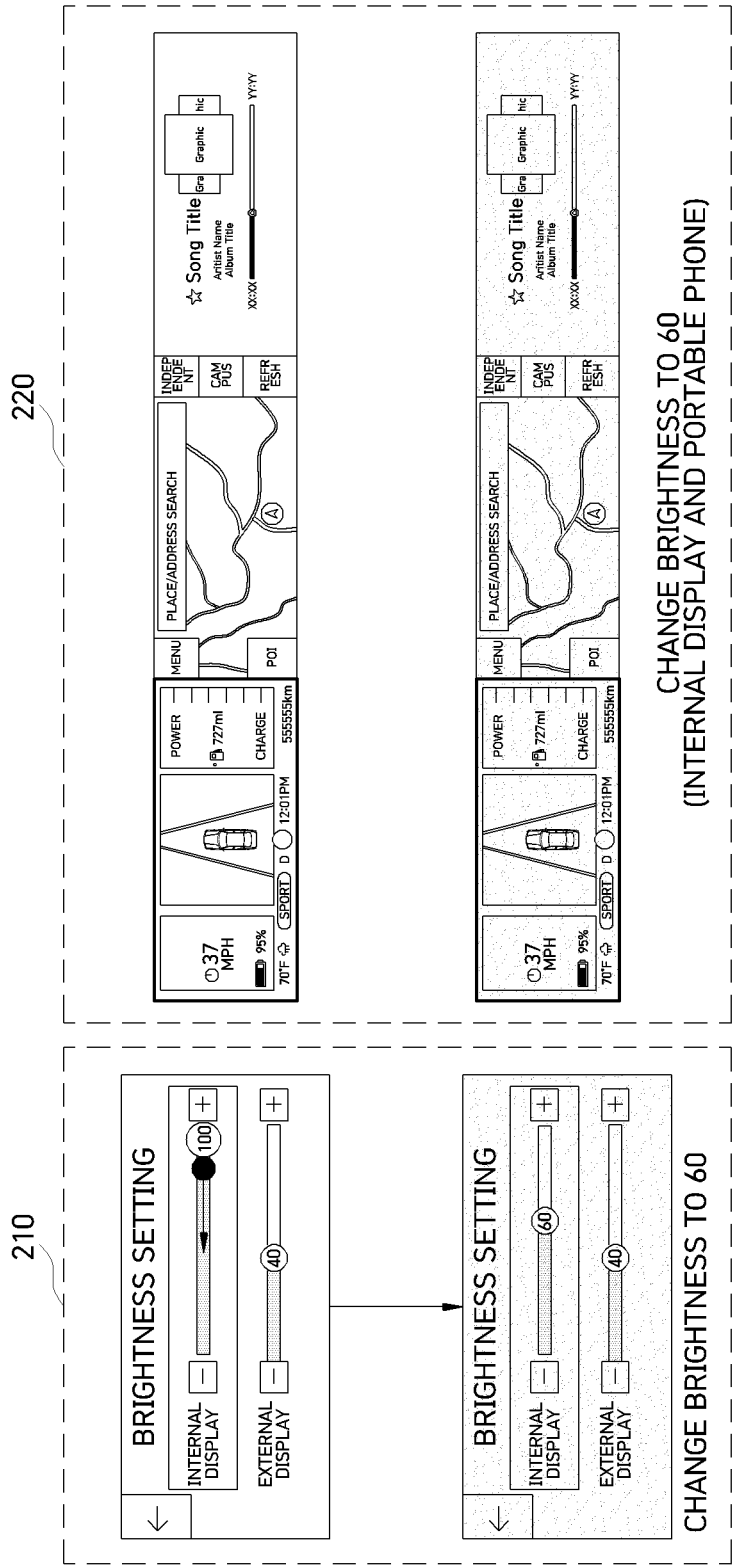
FIG. 2 illustrates a cooperation between internal display brightness and brightness of a portable phone according to an embodiment.

FIG. 2 illustrates a cooperation between internal display brightness and brightness of a portable phone according to an embodiment of the present invention.

In a brightness setting screen of a portable phone 210, brightness of the internal display 220 and external display may be set.

Referring to FIG. 2, brightness of the internal display 220 may be set to 100%, and then, by adjusting brightness of the internal display 220 to 60% in the portable phone 210, brightness of the portable phone 210 and the internal display 220 may be adjusted to 60%.

According to an embodiment of the present invention, the portable phone 210 may display the degree of brightness of the internal display 220 in connection with brightness of the internal display 220, and as the portable phone 210 adjusts brightness, brightness of the internal display 220 and brightness of the portable phone 210 may be adjusted simultaneously.

Figure 3:
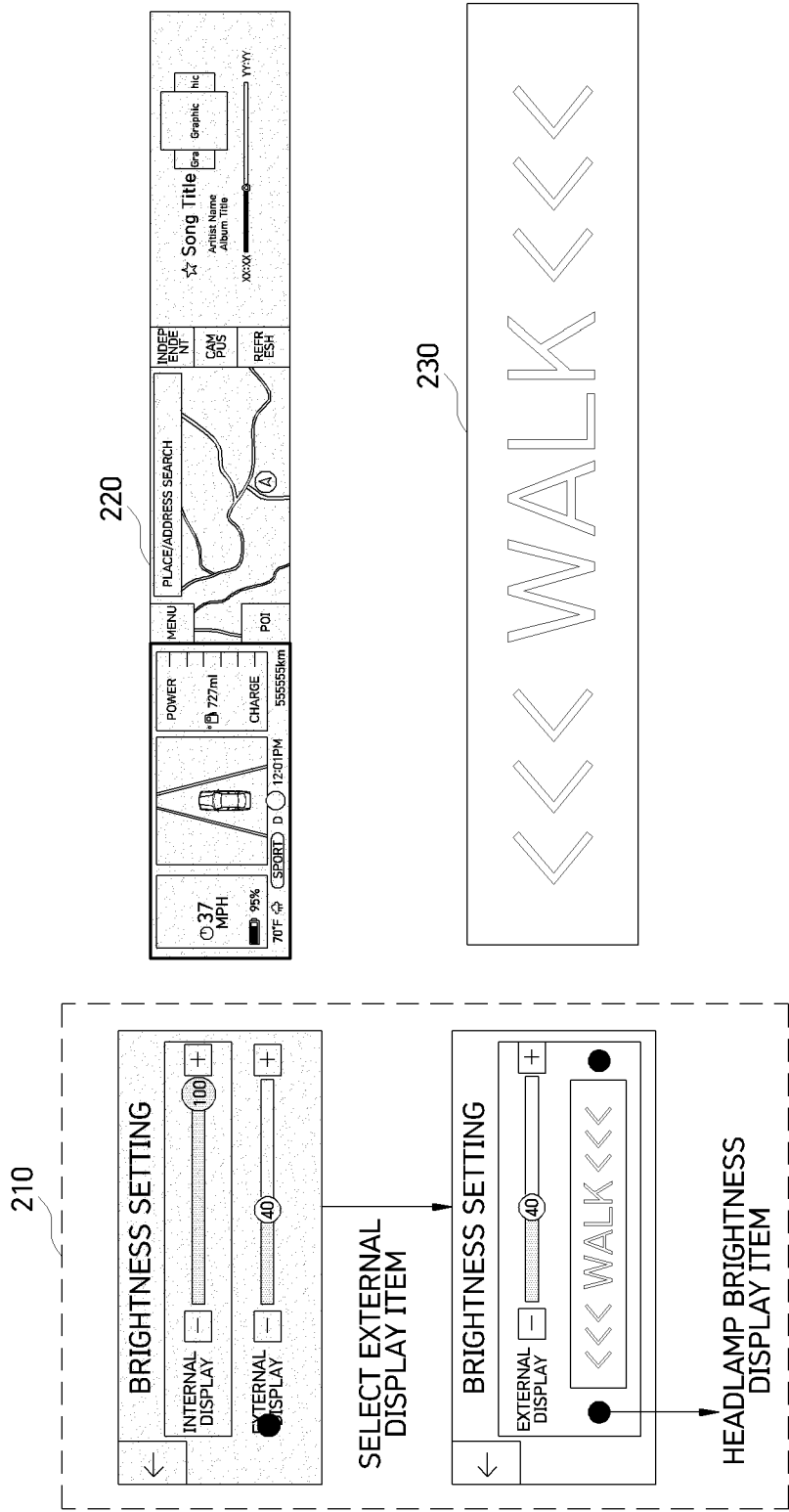
FIG. 3 illustrates a cooperation between external display brightness and brightness of a portable phone according to an embodiment.

FIG. 3 illustrates a cooperation between external display brightness and brightness of a portable phone according to an embodiment of the present invention.

When an external display item is selected in a brightness setting menu of a portable phone 210, background, sentence, and headlamp brightness states displayed on an external display 230 may be displayed through the portable phone 210.

When a focus moves by setting brightness of the external display 230 in the portable phone 210, brightness of the portable phone 210 may be displayed in connection with brightness of the external display 230.

At this time, based on an influence of brightness of a headlamp, a brightness state of the external display 230 may be displayed through the portable phone 210.

Figure 4:
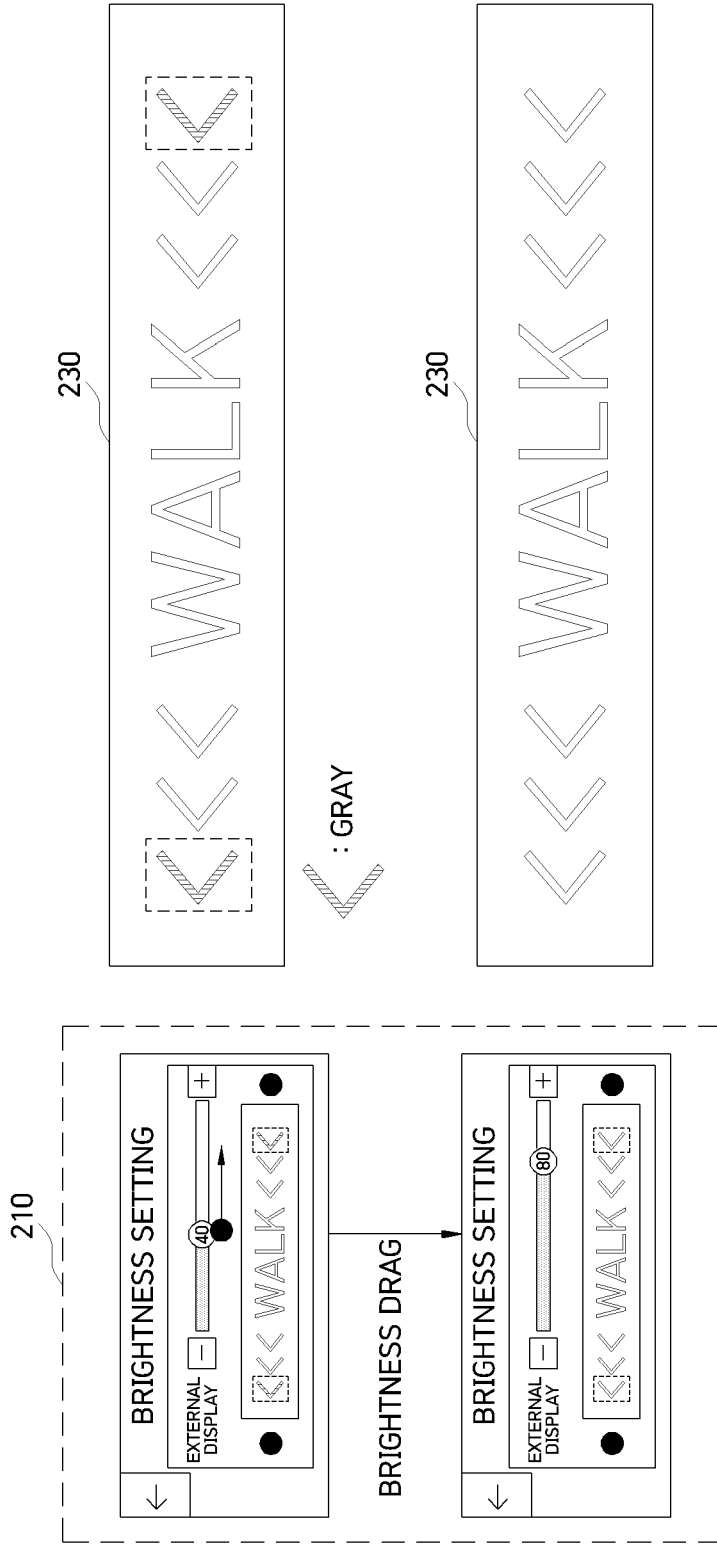
FIG. 4 illustrates a whole brightness setting of external display according to an embodiment.

FIG. 4 illustrates a whole brightness setting of external display according to an embodiment of the present invention.

An example will be described where brightness of a headlamp is bright and thus affects a letter displayed on the external display 230.

Referring to FIG. 4, regions of both end portions among regions of external display 230 may be seen to be dark due to brightness of a headlamp.

When an external display item of a brightness setting menu of a portable phone 210 is focused, brightness may be automatically adjusted so that the external display 230 is seen to be clear.

At this time, a user may adjust a setting of total brightness through post-processing on the basis of an adjacent region.

In a case which adjusts a brightness setting of the external display 230 in the brightness setting menu of the portable phone 210, a state where the external display 230 is actually seen from the outside may be previously checked in a screen of the portable phone 210.

At this time, information may be displayed on the external display 230 by using a high-contrast color.

Figure 5:
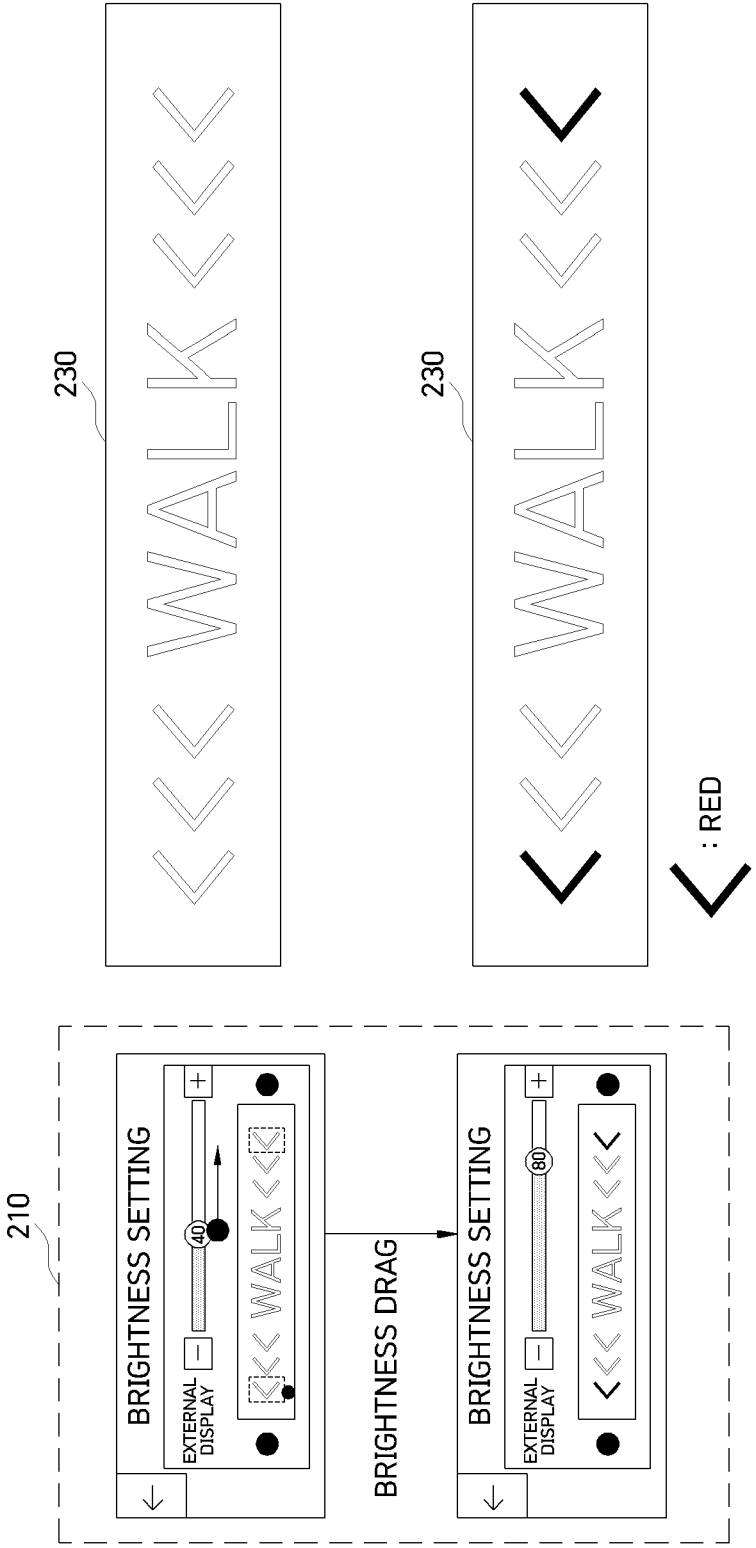
FIG. 5 illustrates a brightness setting of an external display region adjacent to a headlamp according to an embodiment.

FIG. 5 illustrates a brightness setting of an external display region adjacent to a headlamp according to an embodiment of the present invention.

In a brightness setting screen of a portable phone 210, in a case where external display 230 is focused, when a dark region of the external display 230 is touched in a screen of the portable phone 210, brightness of dark portions (portions darkly displayed by a headlamp) of both end portions of the external display 230 may be automatically adjusted.

At this time, brightness of a dark portion may be set to be high so that the dark portion is brightly seen, or visibility may be enhanced by applying another color (a complementary color).

In the external display 230, a region adjacent to the headlamp may be displayed in a complementary color by applying a high-contrast color so as to recognize information and may be information having visibility in the region adjacent to the headlamp, and thus, may be seen clearly from the outside.

FIG. 6A to 6E illustrate a brightness setting according to an embodiment of the present invention.

Figure 6A:
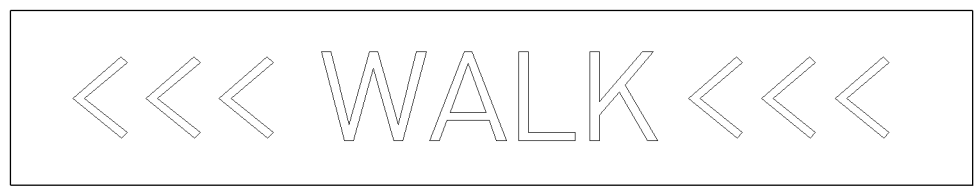
FIGS. 6A to 6E illustrate a brightness setting according to an embodiment of the present invention.

FIG. 6A illustrates displaying of external display in a general situation.

Figure 6B:
Figure 6B:
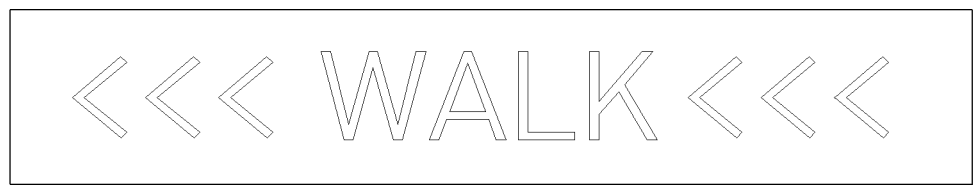

Referring to FIG. 6B, brightness of the external display may be set by reacting on an ambient environment.

Figure 6C:
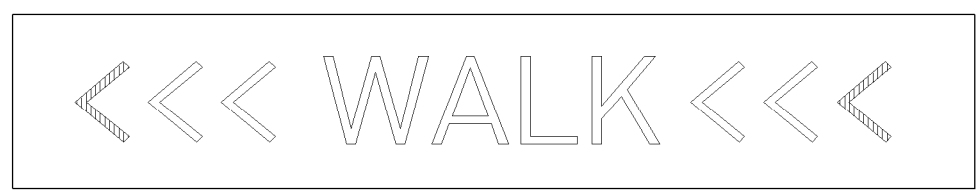
Figure 6C:

Referring to FIG. 6C, a certain region (both end portions and a region adjacent to a headlamp) of the external display may be seen due to brightness of the headlamp.

Figure 6D:
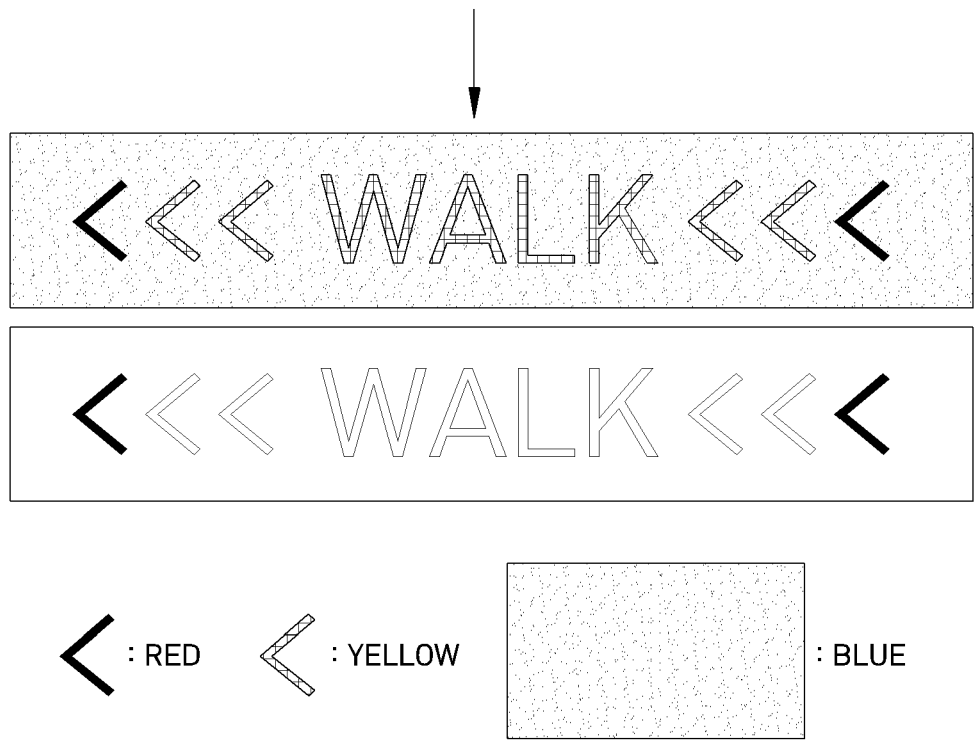
Figure 6E:
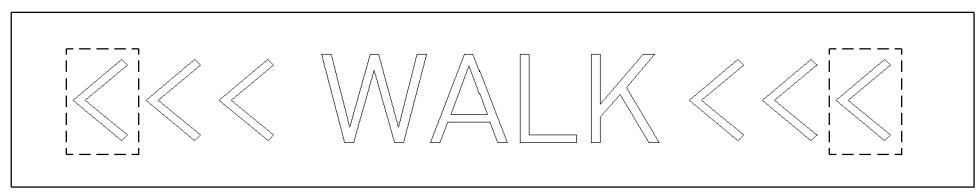

When adjustment of the external display is performed according to the above-described embodiment, as illustrated in FIG. 6D, visibility may be enhanced by providing information, displayed in an adjacent region, in a complementary color, or as illustrated in FIG. 6E, brightness of the region adjacent to the headlamp may be brighter seen than the other region (using a film and the like).

Figure 7:
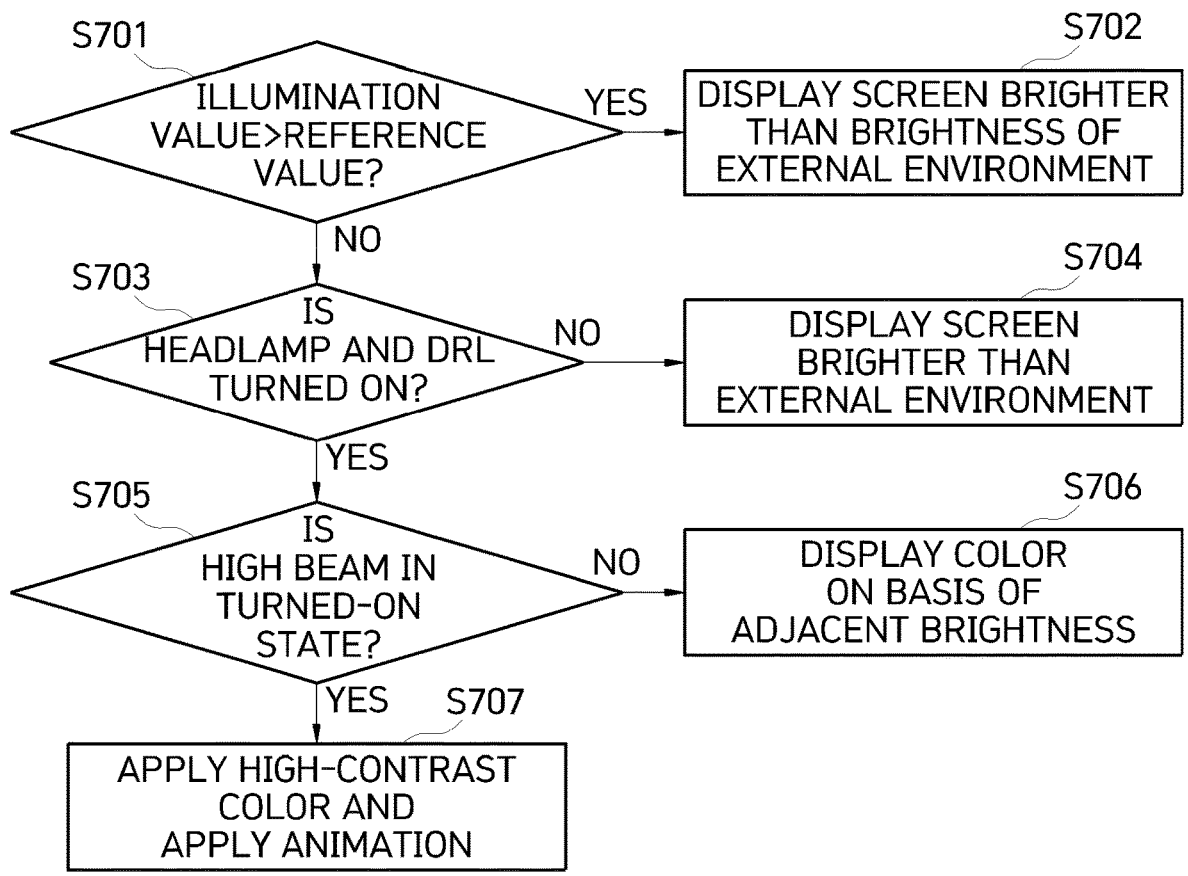
FIG. 7 illustrates a display control method according to an embodiment.

FIG. 7 illustrates a display control method according to an embodiment of the present invention.

In step S701, whether an illumination value is greater than a setting value may be checked by using an illumination sensor.

Figure 8A:
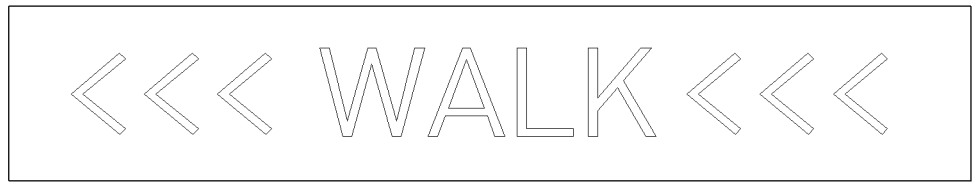
FIGS. 8A to 8D illustrate external display according to an embodiment.

When it is checked in step S701 that the illumination value is greater than the setting value, a screen may be displayed to be brighter than an external environment in step S702. At this time, external display is as illustrated in FIG. 8A.

When it is checked in step S701 that the illumination value is less than or equal to the setting value, whether the headlamp is in a turned-on state may be checked in step S703.

Figure 8B:
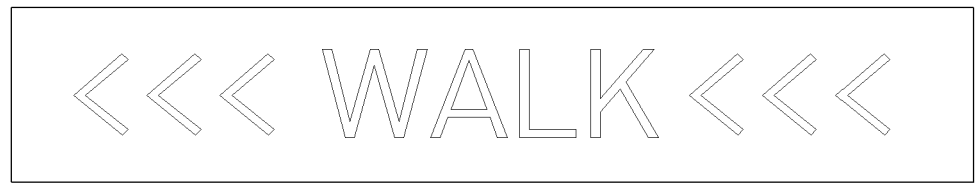

When it is checked in step S703 that the headlamp is not turned on, the screen may be displayed to be brighter than an external environment. At this time, the external display is as illustrated in FIG. 8B.

When it is checked in step S703 that the headlamp is in the turned-on state, whether a high beam is in a turned-on state may be checked in step S705.

Figure 8C:
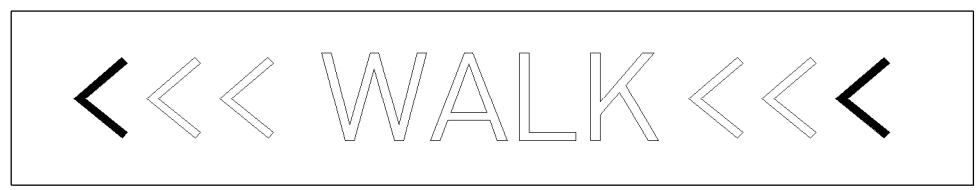

When it is checked in step S705 that the high beam is not in the turned-on state, a color may be displayed based on adjacent brightness of the headlamp in step S706. At this time, the external display is as illustrated in FIG. 8C.

Figure 8D:
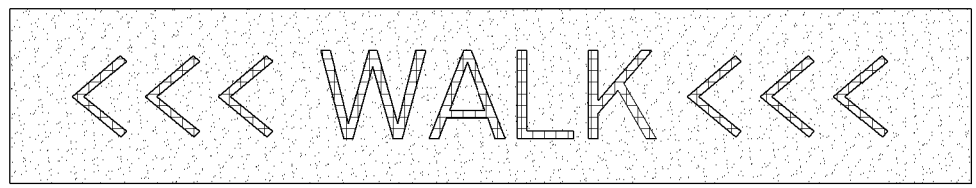
Figure 8D:
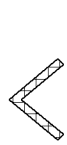
Figure 8D:
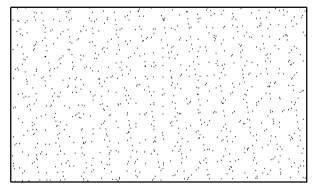

When it is checked in step S705 that the high beam is in the turned-on state, the external display may be controlled by applying a high-contrast color and an animation. At this time, the external display is as illustrated in FIG. 8D.

FIGS. 9A to 9E illustrate external display for each driving situation according to an embodiment of the present invention.

Figure 9A:
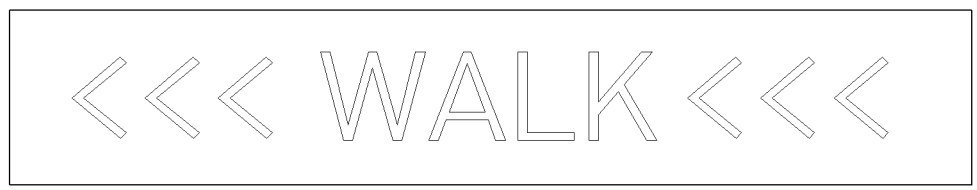
FIGS. 9A to 9E illustrate external display for each driving situation according to an embodiment.

When a pedestrian is crossing a crossing place, a sentence, special letters, and a motion indicating crossing possible may be displayed as illustrated in FIG. 9A.

Figure 9B:
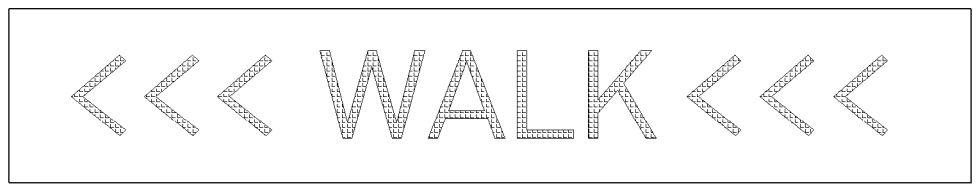

When there is no pedestrian at a crossing place, a screen may be displayed darkly as in FIG. 9B, and thus, battery consumption may be reduced.

Figure 9C:
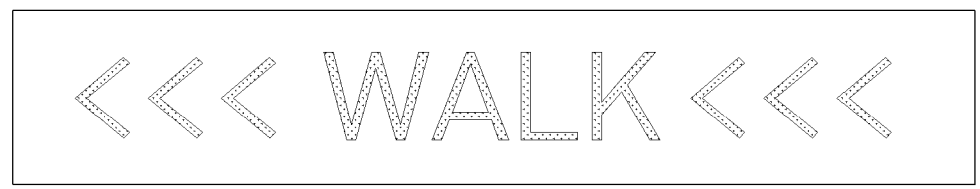

When a pedestrian is at a peripheral place, external display may be naturally and brightly displayed as in FIG. 9C.

Figure 9D:
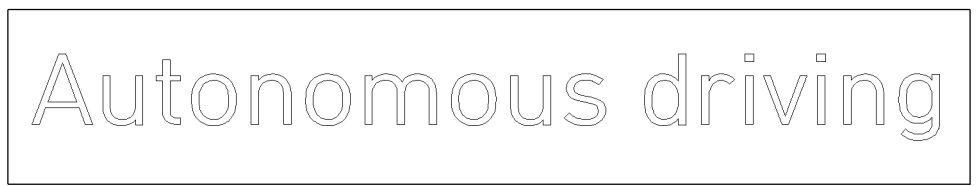

When a vehicle is autonomously driving, a sentence corresponding to an autonomous driving mode may be displayed as in FIG. 9D.

Figure 9E:

When a vehicle is driving on a highway, it may not be required to notify that the vehicle is autonomously driving, and thus, a screen of the external display may be turned off as in FIG. 9E.

The display control method according to the embodiments of the present invention may be implemented in a computer system, or may be stored in a recording medium. The computer system may include at least one processor and memory, a user input device, a data communication bus, a user output device, and a storage. Each of the elements described above may perform data communication through the data communication bus.

The computer system may further include a network interface coupled to a network. The processor may be central processing unit (CPU), or may be a semiconductor device which processes instructions stored in the memory and/or the storage.

The memory and the storage may each include various types of volatile or non-volatile storage mediums. For example, the memory may include read-only memory (ROM) and random access memory (RAM).

Therefore, the display control method according to the embodiments of the present invention may be implemented by using a method executable by a computer. In a case where the display control method according to the embodiments of the present invention is performed by a computer device, computer-readable instructions may perform the display control method according to the embodiments of the present invention.

The input unit or inputter 110, the memory 120, the processor 130, the units, the modules, the devices, and other components described herein with respect to FIGS. 1 to 9E are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The display control method according to the embodiments of the present invention may be implemented as a computer-readable code in a computer-readable recording medium. The computer-readable recording medium may include all kinds of recording mediums which store data readable by a computer system. For example, the computer-readable recording medium may include ROM, RAM, magnetic tape, magnetic disk, flash memory, optical data storage device, etc. Also, the computer-readable recording medium may be stored and executed as a code which is distributed to a computer system connected to a computer communication network and is readable by using a distributed scheme.

According to the present invention, because internal and external display information is displayed based on a driving situation, the readability of a passenger of a vehicle, an external pedestrian, and a driver of the other vehicle may be ensured, and the electricity of a vehicle may be saved.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display control apparatus, comprising:
an inputter configured to receive internal display information and external display information about a vehicle;
a memory storing a control program for an internal display of the vehicle and an external display of the vehicle; and
a processor configured to
control a brightness of the internal display and a brightness of the external display, in connection with a portable terminal, by executing the control program, and
transmit a brightness control signal generated based on a brightness of a headlamp and corresponding to a partial dark region of the external display.

2. The display control apparatus of claim 1, wherein the processor is further configured to adjust the brightness of the internal display based on a setting signal input to the portable terminal and adjust a brightness of the portable terminal to correspond to the adjusted brightness of the internal display.

3. The display control apparatus of claim 1, wherein the processor is further configured to adjust the brightness of the external display based on a setting signal input to the portable terminal, and adjust a brightness of the portable terminal to correspond to the adjusted brightness of the external display.

4. The display control apparatus of claim 1, wherein the processor is further configured to transmit a control signal to apply a complementary color to a sentence displayed on the partial dark region.

5. The display control apparatus of claim 1, wherein the processor is further configured to transmit a control signal so that a sentence displayed on the partial dark region is displayed more brightly than other regions of the external display.

6. The display control apparatus of claim 1, wherein the processor is further configured to automatically control the brightness of the external display to a predetermined brightness based on a presence of a pedestrian.

7. The display control apparatus of claim 1, wherein the processor is further configured to determine whether to activate the external display, based on a driving environment.

8. The display control apparatus of claim 1, wherein the portable terminal is a portable phone.

9. A method with display control, comprising:
performing, by a processor, control on a brightness of an internal display of a vehicle and a brightness of an external display of the vehicle, in connection with a portable terminal;
adjusting, by the processor, the brightness of the external display based on a setting signal; and
adjusting, by the processor, a brightness of the portable terminal to correspond to the adjusted brightness of the external display.

10. The method of claim 9, further comprising:
adjusting, by the processor, the brightness of the internal display based on a setting signal; and
adjusting, by the processor, a brightness of the portable terminal to correspond to the adjusted brightness of the internal display.

11. A display control apparatus, comprising:
a memory storing a control program for an internal display of the vehicle and an external display of the vehicle; and
a processor configured to execute the control program to
control a brightness of the internal display and a brightness of the external display, in connection with a portable terminal,
adjust the brightness of the internal display based on a setting signal input to the portable terminal, and
adjust a brightness of the portable terminal to correspond to the adjusted brightness of the internal display.

* * * * *